(12) United States Patent
Paik

(10) Patent No.: US 10,324,537 B2
(45) Date of Patent: Jun. 18, 2019

(54) MULTI-LANGUAGE KEYBOARD SYSTEM

(71) Applicant: John Paik, Herndon, VA (US)

(72) Inventor: John Paik, Herndon, VA (US)

(73) Assignee: John Park, Herndon, VA (US)

( * ) Notice: Subject to any disclaimer, the term of this patent is extended or adjusted under 35 U.S.C. 154(b) by 190 days.

(21) Appl. No.: 15/609,474

(22) Filed: May 31, 2017

(65) Prior Publication Data
US 2018/0348887 A1    Dec. 6, 2018

(51) Int. Cl.
G06F 3/0488    (2013.01)
G06F 3/01    (2006.01)
G06F 17/21    (2006.01)
G06F 17/28    (2006.01)

(52) U.S. Cl.
CPC .......... *G06F 3/018* (2013.01); *G06F 3/04886* (2013.01); *G06F 17/214* (2013.01); *G06F 17/2863* (2013.01)

(58) Field of Classification Search
CPC .................................................. G06F 3/04886
USPC ......................................................... 715/773
See application file for complete search history.

(56) References Cited

U.S. PATENT DOCUMENTS

| | | | | |
|---|---|---|---|---|
| 4,335,940 A | * | 6/1982 | Morgan | B41B 17/10 396/553 |
| 4,335,941 A | * | 6/1982 | Moyroud | B41B 17/10 396/552 |
| 4,484,305 A | | 11/1984 | Ho | |
| 5,079,702 A | * | 1/1992 | Ho | G06F 17/2863 715/264 |
| 5,295,238 A | * | 3/1994 | Dickson | G06F 17/214 345/170 |

(Continued)

FOREIGN PATENT DOCUMENTS

| | | |
|---|---|---|
| KR | 20040092626 | 11/2004 |
| KR | 20110088311 | 8/2011 |
| KR | 101325653 | 11/2013 |

OTHER PUBLICATIONS

Notification of Transmittal of the International Search Report and the Written Opinion of the International Searching Authority, or the Declaration issued for International Application No. PCT/US 18/34175 dated Aug. 10, 2018.

*Primary Examiner* — Daniel Rodriguez
(74) *Attorney, Agent, or Firm* — Greenblum & Bernstein, P.L.C.

(57) ABSTRACT

A method for combining of alphabet characters of different languages is provided. The method includes loading, from a memory, a combined virtual keyboard providing simultaneous access to both an alphabet character of a first language and an alphabet character of a second language. On the combined keyboard, an input of the alphabet character of the first language and an input of the alphabet character of the second language are received for display. Each of the inputted alphabet characters of the first language and the second language has an image of respective alphabet character surrounded by a quadrilateral boundary of a predetermined size. When the alphabet characters are combined, at least one of the alphabet character of the first language and the alphabet character of the second language shifted towards each other, such that boundaries surrounding the alphabet characters are partially overlapped.

22 Claims, 21 Drawing Sheets

(56) References Cited

U.S. PATENT DOCUMENTS

| | | | | |
|---|---|---|---|---|
| 5,432,890 | A * | 7/1995 | Watanabe | G06K 15/02 345/467 |
| 6,603,478 | B1 * | 8/2003 | Kuo | G06F 3/018 345/467 |
| 7,257,528 | B1 | 8/2007 | Ritchie et al. | |
| 7,492,366 | B2 * | 2/2009 | Burago | G06F 17/215 345/467 |
| 8,103,499 | B2 * | 1/2012 | Lai | G06F 3/0237 345/168 |
| 9,298,277 | B1 * | 3/2016 | Alsabah | G06F 17/2223 |
| 9,841,873 | B1 * | 12/2017 | Schroeder | G06F 3/04886 |
| 2004/0108994 | A1 * | 6/2004 | Kato | G06F 3/0236 345/171 |
| 2006/0248459 | A1 * | 11/2006 | Su | G06F 3/018 715/703 |
| 2007/0016862 | A1 * | 1/2007 | Kuzmin | G06F 3/0236 715/700 |
| 2008/0297480 | A1 | 12/2008 | Lee | |
| 2008/0304892 | A1 * | 12/2008 | Baker | G06F 3/0219 400/486 |
| 2009/0262082 | A1 * | 10/2009 | Park | G06F 3/018 345/171 |
| 2010/0167244 | A1 * | 7/2010 | Su | G09B 19/04 434/157 |
| 2010/0241985 | A1 * | 9/2010 | Kim | G06F 3/04886 715/773 |
| 2010/0309137 | A1 * | 12/2010 | Lee | G06F 3/018 345/171 |
| 2010/0309147 | A1 * | 12/2010 | Fleizach | G06F 3/04883 345/173 |
| 2011/0202839 | A1 * | 8/2011 | AlKazi | G06F 3/0233 715/703 |
| 2011/0206437 | A1 * | 8/2011 | Baker | G06F 3/0219 400/486 |
| 2011/0289398 | A1 * | 11/2011 | Chin | G06F 17/245 715/227 |
| 2012/0081297 | A1 | 4/2012 | Heo | |
| 2012/0274573 | A1 | 11/2012 | Hwang | |
| 2012/0313858 | A1 * | 12/2012 | Park | G06F 3/0238 345/171 |
| 2013/0222262 | A1 | 8/2013 | Lee et al. | |
| 2013/0271383 | A1 * | 10/2013 | Hwang | G06F 3/018 345/171 |
| 2014/0035823 | A1 * | 2/2014 | Khoe | G06F 3/02 345/171 |
| 2014/0143703 | A1 | 5/2014 | AlKazi et al. | |
| 2014/0176564 | A1 * | 6/2014 | Tang | G06F 17/214 345/471 |
| 2014/0285495 | A1 * | 9/2014 | Kang | G06F 17/2223 345/471 |
| 2014/0359426 | A1 * | 12/2014 | Dou | G06F 17/2247 715/234 |
| 2015/0177847 | A1 | 6/2015 | Swartz et al. | |
| 2015/0187358 | A1 | 7/2015 | Chou | |
| 2015/0212592 | A1 * | 7/2015 | Molla | G06F 3/0237 345/169 |
| 2015/0220217 | A1 * | 8/2015 | Alshafai | G06F 9/454 715/703 |
| 2015/0324162 | A1 * | 11/2015 | Kim | G06F 3/1438 345/169 |
| 2016/0026258 | A1 * | 1/2016 | Ou | G06F 17/276 715/773 |
| 2016/0062633 | A1 * | 3/2016 | Ahn | G06F 3/04883 345/173 |
| 2016/0202903 | A1 * | 7/2016 | Gutowitz | G06F 3/04886 715/771 |
| 2016/0246385 | A1 * | 8/2016 | Deshmukh | G06F 3/018 |
| 2017/0139874 | A1 * | 5/2017 | Chin | G06F 17/211 |
| 2017/0147202 | A1 * | 5/2017 | Donohue | G06F 3/04886 |
| 2017/0206004 | A1 * | 7/2017 | De Bruyn | G06F 17/2223 |
| 2017/0351341 | A1 * | 12/2017 | Norwalk | G06F 3/021 |

* cited by examiner

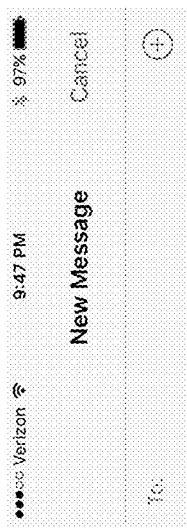
FIG. 2A
(PRIOR ART)
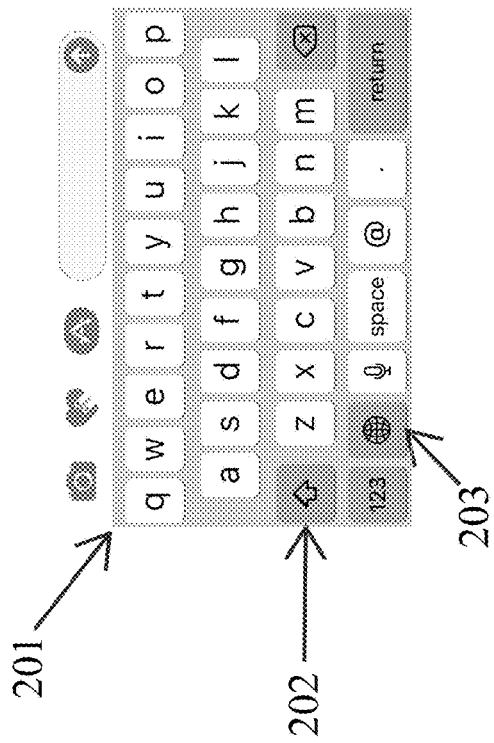

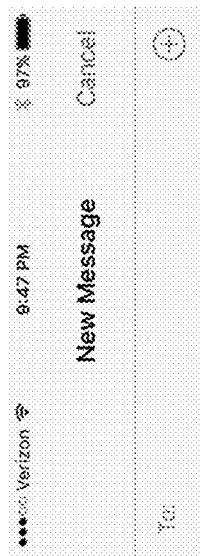
FIG. 2B
(PRIOR ART)

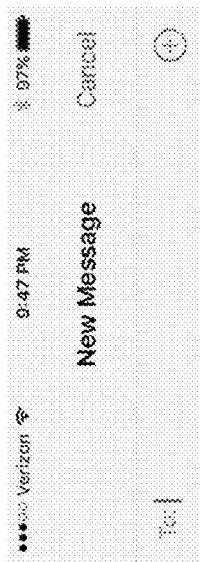
FIG. 2C (PRIOR ART)

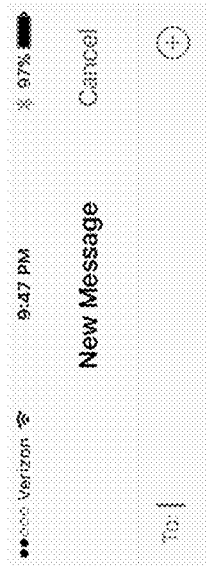
FIG. 2D
(PRIOR ART)

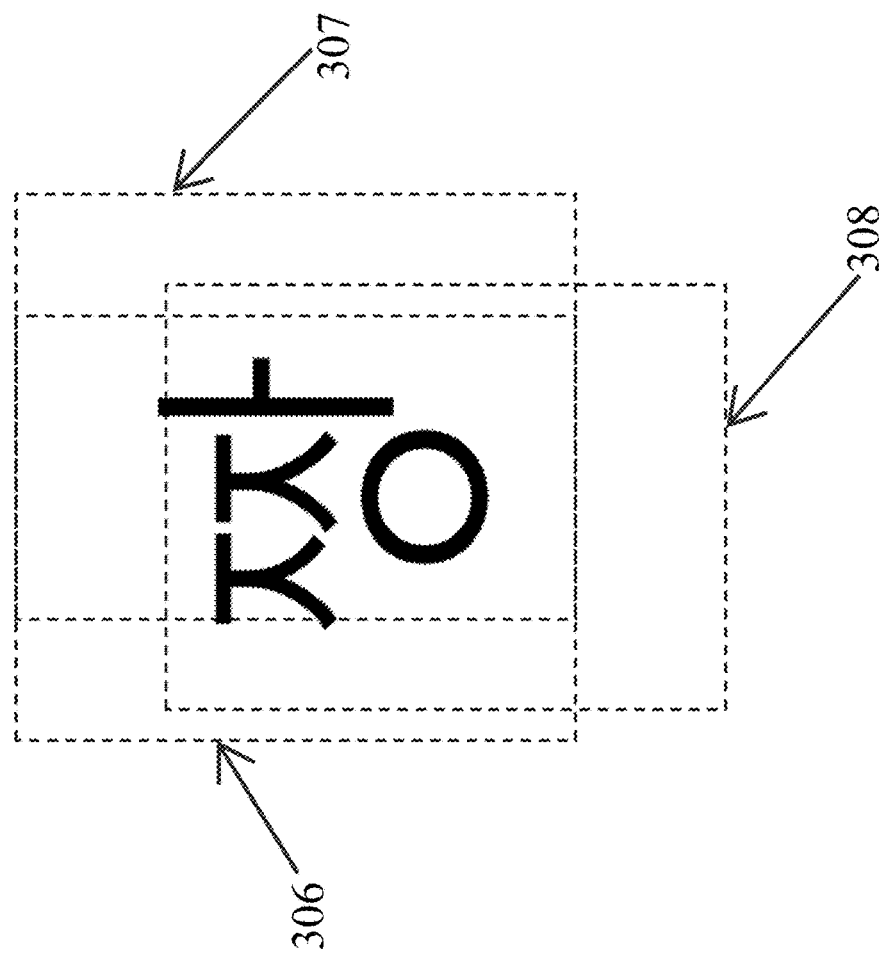

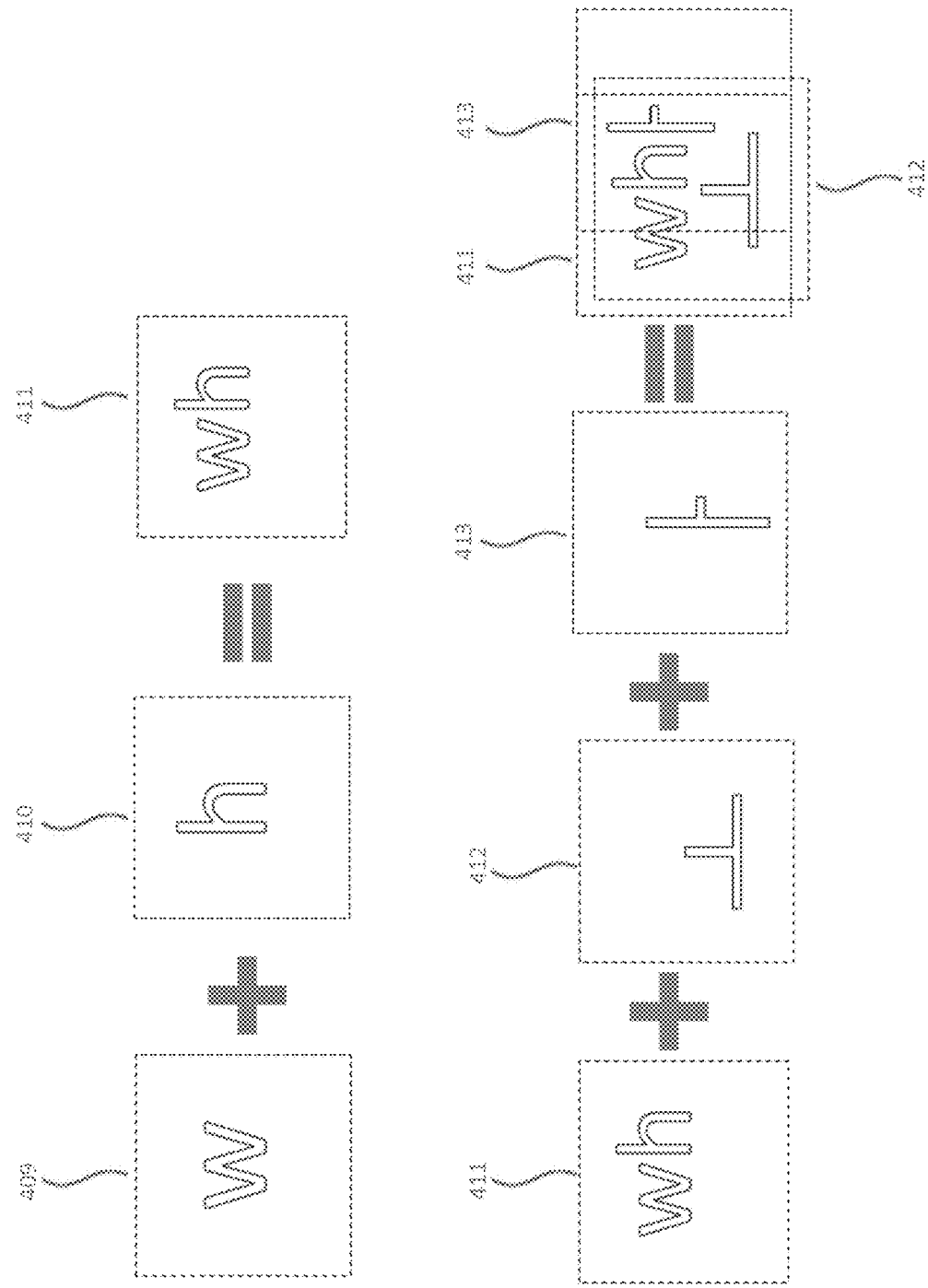

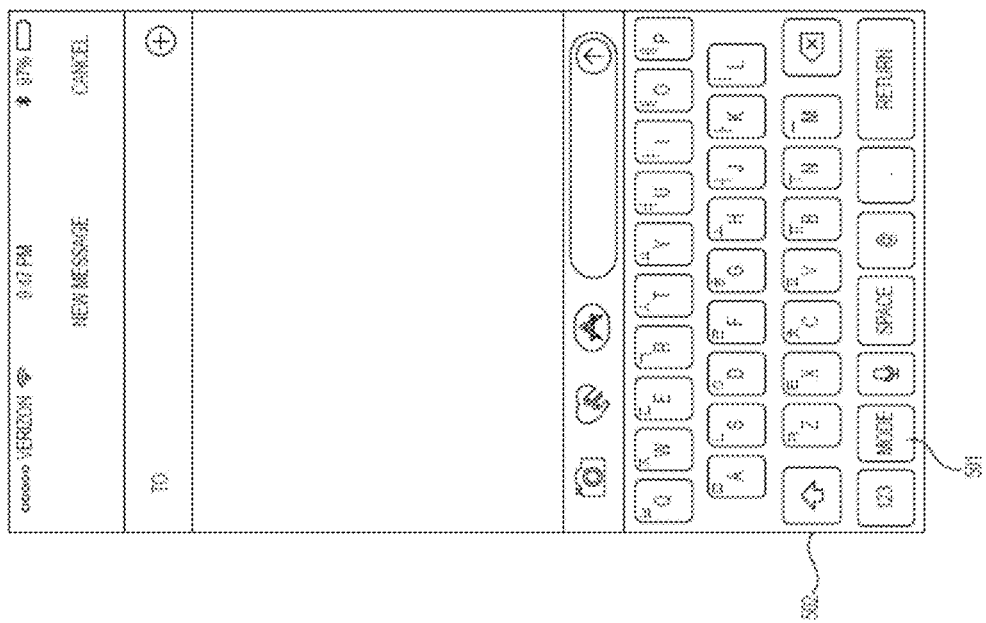

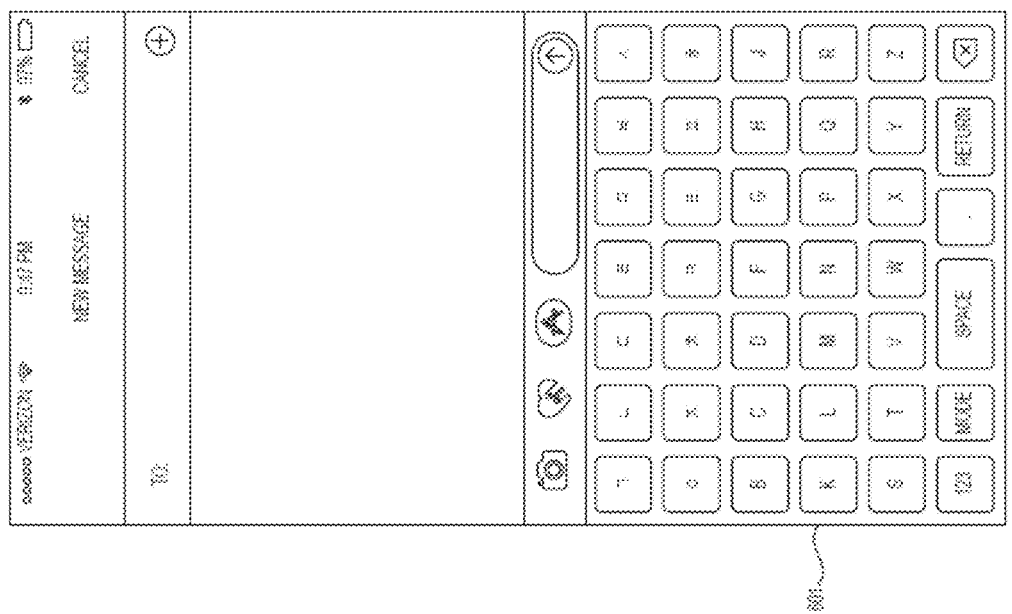

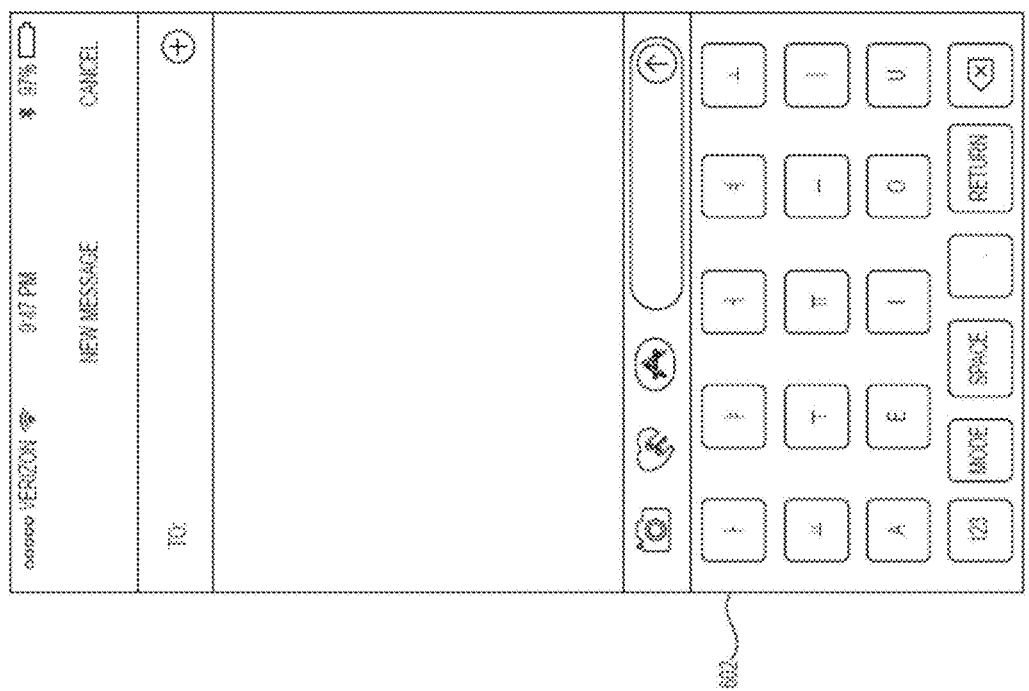

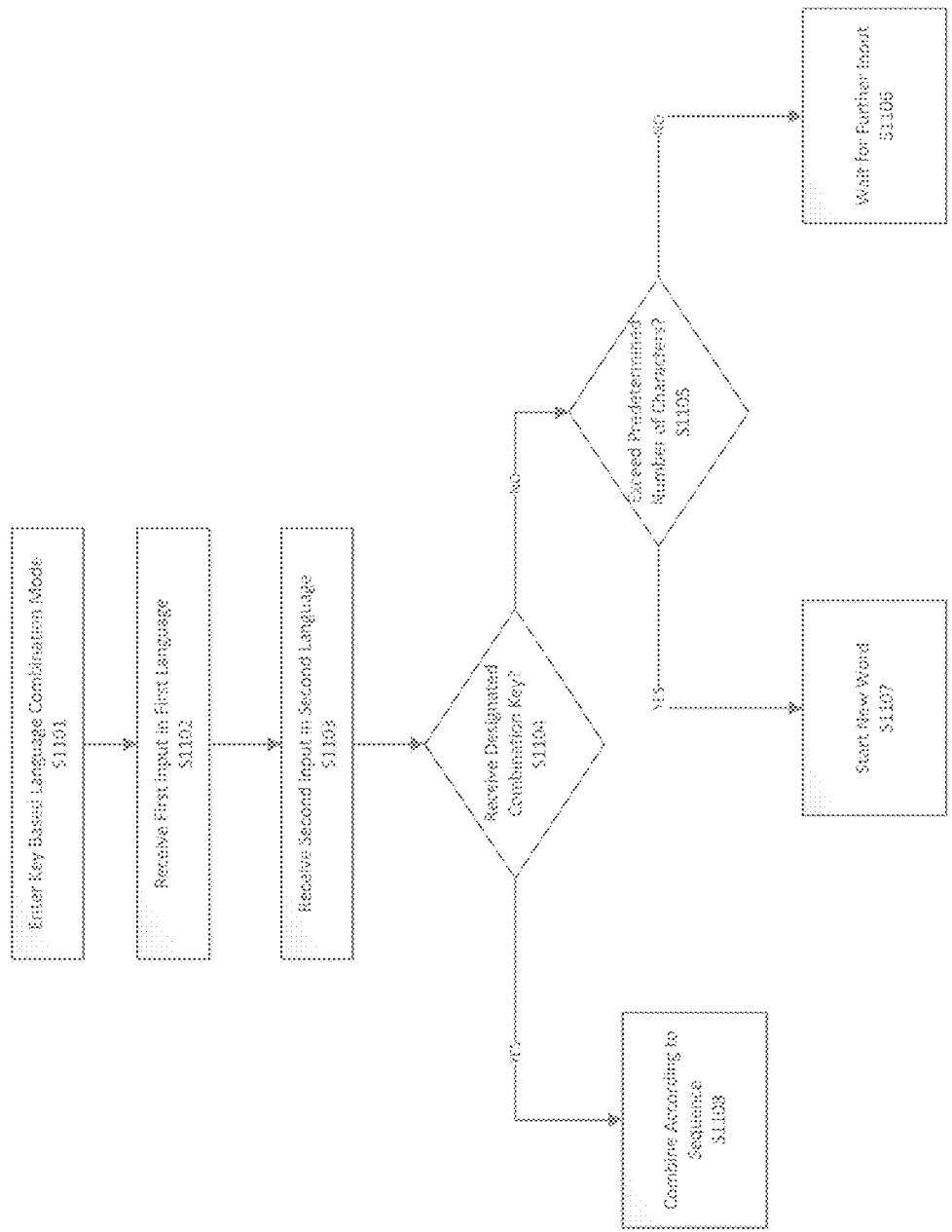

MULTI-LANGUAGE KEYBOARD SYSTEM

BACKGROUND

1. Field of the Disclosure

The present disclosure relates to a keyboard system for receiving one or more inputs. More particularly, the present disclosure relates to a multi-language keyboard system that has simultaneous access to alphabet characters of at least two different languages, each language including a set of consonants and a set of vowels.

2. Background Information

In an increasingly globally connected society, many of its members are exposed to different languages.

For those who may be bilingual, even those that have a rudimentary understanding of a second language may be able to communicate with other bilinguals in mixture of languages. For example, one may be able to intermix words of different languages convey one's thoughts to another. Although such conversation may be undecipherable by a person knowing only a single language, it may be understood by those having knowledge of both languages.

Further, bilinguals may also be able to perform written communication by intermixing characters of two different languages. In this regard, a bilingual having a phonetic understanding of two languages, may be able to intermix characters of two different languages generate a word with a common phonetic understanding. For example, a bilingual with knowledge of both Korean and English language would understand that "jja", or a combination of "ㅉ" with "a" produces a similar phonetic sound. Accordingly, a person with understanding of both alphabets would understand words being that are being conveyed, whether the original word is in English or Korean.

However, when alphabet characters of different languages are inputted adjacent to one another, a notice gap appears between the characters. As such, when large amount of characters are provided together, even those of understanding of alphabets of two different languages may have difficulty understanding what is being conveyed by the combination of alphabets of two different languages. However, when a word is typed in combination of both English and Korean alphabet characters, alphabet characters of different languages are distanced apart from one another rendering it difficult to decipher a grouping of such alphabet characters.

Further, as exemplified above, Korean alphabet characters may be aligned horizontally or vertically when being combined with other characters to form a word. However, at least because current keyboards won't recognize a relationship between alphabet characters of two different languages, no such combination is available, rendering it more difficult to decipher the grouping of alphabet characters of the different languages. For example, although a Korean alphabet character "ㅗ" is typically vertically aligned such that another alphabet character is aligned above or below the respective character (e.g., "송"), when the noted character is combined with an English character, they are positioned to be adjacent to one another (e.g., "oㅗoㅏ") rendering it more difficult to decipher how the characters of two different languages are to be combined.

In addition, general keyboards do not generally allow contemporaneous access to alphabet characters of different languages from a single keyboard. Accordingly, every time the user wants to input an alphabet character of a different language, present keyboard would have to be stored away in memory and a keyboard for the different language would have to be loaded from the memory. For example, if the user inputs a Korean alphabet character and then seeks to input an English alphabet character adjacent to the inputted Korean alphabet character, the user would have to switch out the respective keyboards. More specifically, the Korean keyboard will be stored in memory, and the English keyboard will be retrieved or loaded from the memory to allow the user to input the English alphabet character. Thus, such configurations provide inefficient usage of memory and cumbersome operation.

BRIEF DESCRIPTION OF THE DRAWINGS

FIG. 2A shows a general English keyboard for receiving default English alphabet character input;

FIG. 2B shows a general English keyboard for receiving English alphabet character input when actuating a shift key;

FIG. 2C shows a general Korean keyboard for receiving Korean alphabet input;

FIG. 2D shows a general Korean keyboard for receiving Korean alphabet input when actuating a shift key;

FIG. 3C shows a display of combined Korean alphabet characters;

FIG. 4D shows an exemplary display of a sub-combination of alphabet characters, according to an aspect of the present disclosure;

FIG. 5 shows an exemplary combined language keyboard layout, according to an aspect of the present disclosure;

FIG. 6A shows another exemplary combined language keyboard layout with a consonant grouping, according to an aspect of the present disclosure;

FIG. 6B shows another exemplary combined language keyboard layout with a vowel grouping, according to an aspect of the present disclosure;

FIG. 11 shows an exemplary process flow for combining alphabet characters of different languages, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
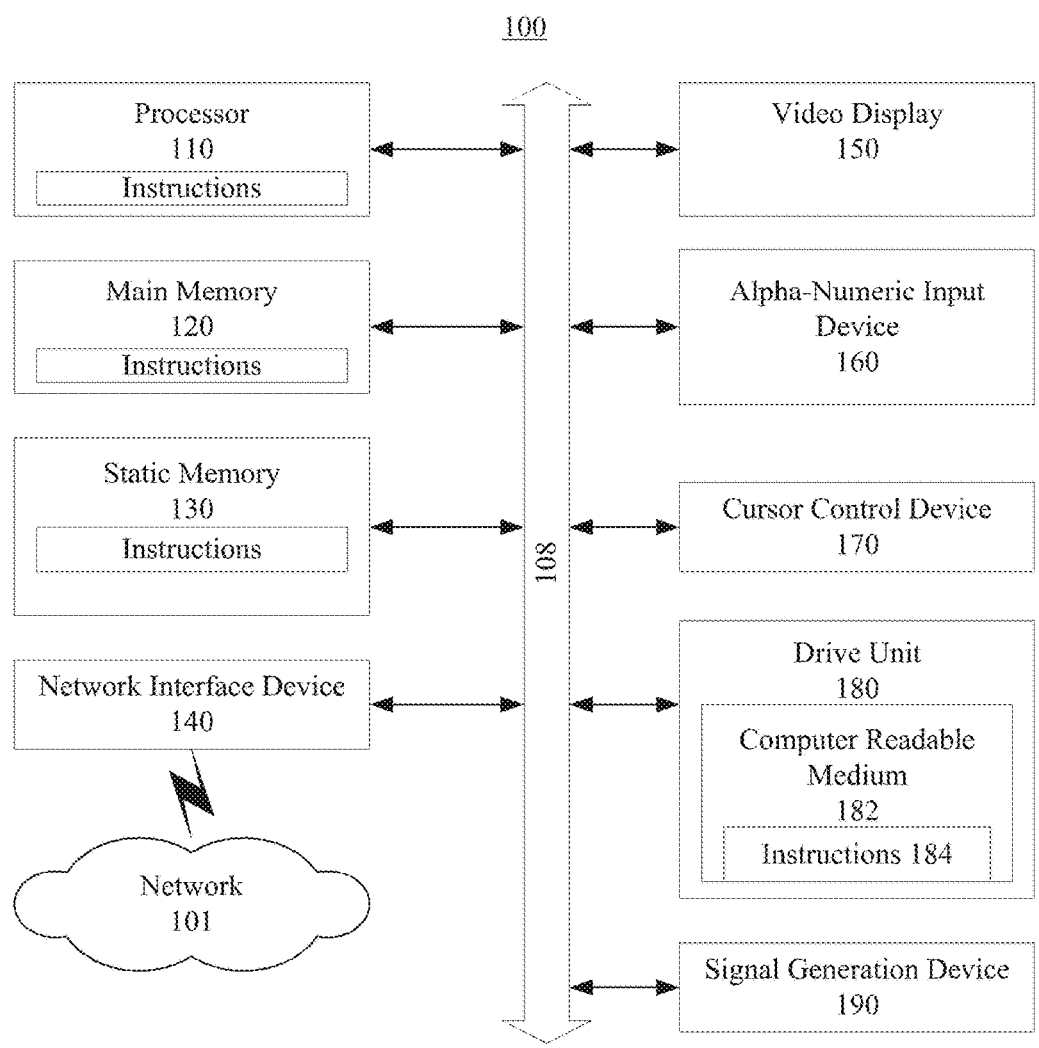
FIG. 1 shows an exemplary general computer system that is configured to combine alphabet characters of differing languages, according to an aspect of the present disclosure.

FIG. 1 shows an exemplary general computer system that is configured to combine alphabet characters of differing languages, according to an aspect of the present disclosure.

A computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

As described herein, an entity such as a communications service provider can resolve security vulnerabilities both reactively and proactively. A communications service provider may today have unique access to user data for user communications that cross a network provided by or managed by the communications service provider. However, a communications service provider may also provide access to such user data to a third party, such as a government or security firm in order to help resolve security vulnerabilities.

The amount of data that can be used in a security analysis is enormous, and properly termed herein "Big Data". For example, a communications service provider may store data for user communications such as upload and download volumes, times, destination addresses, logged-in users, and so on. Additionally, an individual application installed on a device may also transmit data to a system coordinated by the application provider. An operating system provider may transmit data to a system coordinated by the operating system provider. Local access nodes such as public Wi-Fi providers may also forward data to a coordinated system. In any of these instances, the data may be upload, download, time, address, logged-in user, and other forms of metadata descriptive of a communication.

The data may be representative of a website visit, such as when a user of a smart phone uses the smart phone to visit a website. The communications service provider that provides network access for the smart phone may record the metadata for the visit and all internet use, such as the data described above. For lengthy visits to a website, the communications service provider may record a set amount of time visiting a website as a visit, such as 5 minutes. In this way, a user using a smart phone to visit a single website for 30 minutes may be recorded as visiting the website six times for the purposes of the present disclosure.

Additionally, the information stored and used by a communications service provider can vary. For example, more detailed data may be stored and only selectively used, such as to show a time sequence of domain visits. In this case it can be possible to see, for example, which webpages are redirecting to another, "risky", webpage. The default data used for reviews may be only base flow aggregates such as showing upload and download volumes for, e.g., 5 minute time periods, so as to review aggregated data for customer uses until an anomaly is detected from the aggregated data. When an anomaly is detected, the more detailed information from a period can be obtained and reviewed to identify the likely source or cause of the anomaly.

A theme that runs through this disclosure is that the data descriptive of communications, i.e., the metadata maintained by communications service providers, application and operating system providers, network access providers and so on, can be used to diagnose security vulnerabilities. Customers who use user devices may be engaging in unsafe behavior by visiting certain websites, clicking on certain links, and so on. Use of comprehensive data of use of user devices and even just applications on user device provides an ability to resolve customer communication security vulnerabilities both reactively and proactively.

FIG. 2A shows a general English keyboard for receiving English alphabet input, and FIG. 2B shows a general English keyboard for receiving English alphabet character input when actuating a shift key. FIG. 2C shows a general Korean keyboard for receiving Korean alphabet input, and FIG. 2D shows a general Korean keyboard for receiving Korean alphabet input when actuating a shift key.

Generally, in order to input alphabet characters of a first language on a computing device, such as a smart phone or a laptop, a keyboard layout of the first language would have to be retrieved from a memory and loaded onto a display to be accessed. As illustrated in FIG. 2A, a general English keyboard 201 may include images of various alphabet characters, numbers, various command keys and punctuations. The English keyboard 201 may display all of 26 English alphabet characters. The English alphabet includes 5 pure vowels (a, e, i, o, u), 19 pure consonants, and 2 semi-vowels (y, w). The English alphabet may be displayed in a lower case format or in an upper case format by actuating a shift key 202. As illustrated in FIG. 2B, the English alphabet characters may be displayed in the upper case format for entry when the shift key 202 is actuated.

If a user wants to then input alphabet characters of a second language, the user may press on a language switch key or button 203 to initiate switching out of the keyboards. For example, when the keyboards are instructed to be switched out, the keyboard layout of the first language would become stored in memory and a keyboard layout of the second language would be retrieved from the memory and loaded onto the display to be accessed. Accordingly, a lag may be detected when typing using different language keyboards. Further, user may be required to click on one or more buttons to switch out different language keyboards.

For example, FIG. 2C illustrates a general Korean keyboard. The Korean keyboard 204 may include images of various alphabet characters, numbers, various command keys and punctuations. Other than the alphabet characters, many of the other keys may be similar to those of the English keyboard. The Korean keyboard layout 204 may display 24 basic Korean alphabet characters, but is configured to allow access to 11 additional compound voles and 5 double consonants.

As illustrated in FIG. 2D, the above noted double consonants and the compound vowels may be displayed for entry when the shift key 205 is actuated.

Different from the English language, Korean alphabet does not include a lower case or upper case of any alphabet character. However, Korean alphabet system does include five double consonants and two compound vowels that are accessible by actuating a shift key 205. For example, the shift key 205 is typically used to enter double consonants " ㅃ ", " ㅉ ", " ㄸ ", " ㄲ ", and " ㅆ ", which correspond to singular consonants of " ㅂ ", " ㅈ ", " ㄷ ", " ㄱ ", and " ㅅ ", respectively. As illustrated above, the double consonants include two of the noted singular consonants in a modified format, which displays two of the singular consonants to be smaller in size and closer together in a combined format. Further, the shift key may be used to enter an entry of compound vowels " ㅐ " and " ㅔ ", which correspond to singular vowels " ㅐ " and " ㅔ ".

Figure 3A:
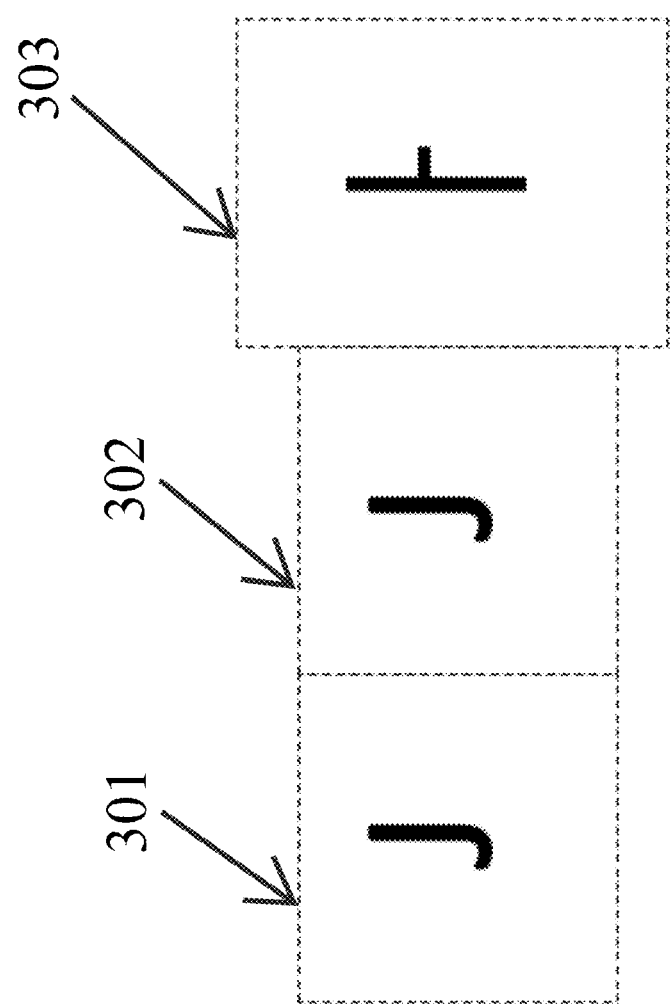
FIG. 3A shows a display of English alphabet characters combined with a Korean alphabet character.
Figure 3B:
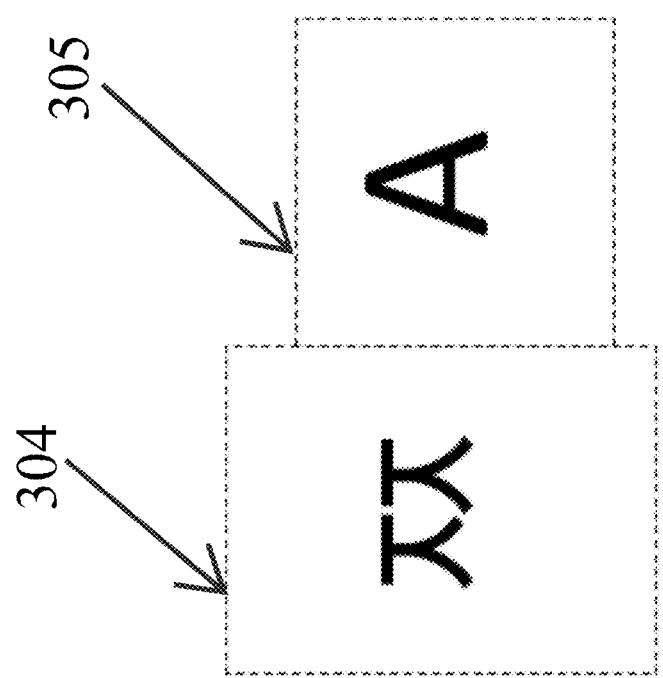
FIG. 3B shows a display of combined Korean alphabet character adjacent to an English alphabet character.
Figure 3D:
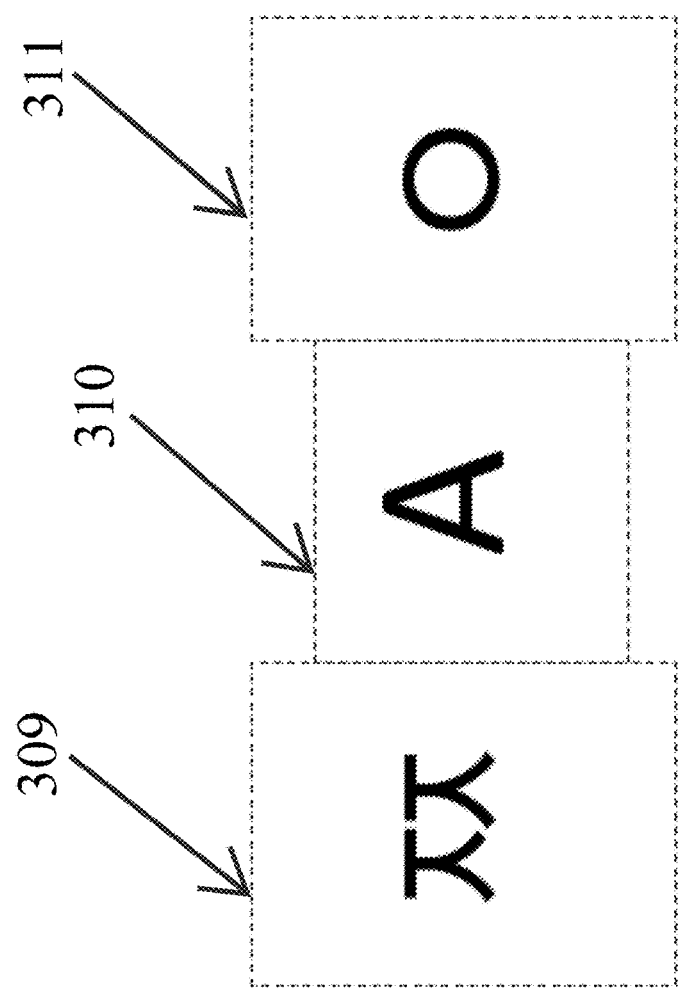
FIG. 3D shows a display a combination of a Korean alphabet character and an English alphabet character.

FIG. 3A shows a display of English alphabet characters combined with a Korean alphabet character. FIG. 3B shows a display of combined Korean alphabet character adjacent to an English alphabet character. FIG. 3C shows a display of combined Korean alphabet characters. FIG. 3D shows a display a combination of a Korean alphabet character and an English alphabet character.

As illustrated in FIG. 3A, an English alphabet character may have a designated boundary of a specific size, with the alphabet character being centrally located with the boundary. When the English alphabet characters are provided sequentially, outer boundaries of each alphabet character may be aligned to overlap another. Size of the boundaries for each of the English alphabet character may be uniform in size, such that when the boundaries are aligned, a user may be able to perceive a particular grouping of alphabet characters forming a word. Similarly, an alphabet character of another language may similarly have a designated boundary. In an example, a designated boundary of an English alphabet character may be of a predetermined size, which may be same as or different from a designated boundary of a different language.

More specifically, when English alphabet characters of "J" are entered twice, the first letter "J" and second letter "J" are adjacently aligned by aligning a right edge of a boundary 301 of the first letter "J" and a left edge of a boundary 302 of the second letter "J". In addition, when a Korean alphabet character " ㅏ " is inputted after the second letter "J", a left edge of a boundary 303 of the Korean alphabet character " ㅏ " is horizontally aligned to coincide with a right edge of the boundary 302 of the second letter "J".

Because the boundary 303 may be of a different size, the boundary 303 may be vertically aligned based on its midpoint of its side edges. Also, due to difference in size of the boundaries of alphabet characters of differing languages, spacing between images of differing languages may be more pronounced rendering the combination of alphabet characters of mixed languages more difficult to decipher.

Similar to FIG. 3A, FIG. 3B illustrates a Korean alphabet character " ㅉ " having a boundary 304 being inputted and providing an English alphabet character "A" having a boundary 305 adjacent to the Korean alphabet character. Again, due to differing sized boundaries, separation between the alphabet characters of differing languages are more pronounced than if only English alphabet characters were displayed. In an example, such separation may be, at least in part, be based on how alphabet characters are combined to form words in respective languages.

Although English alphabet characters are horizontally aligned to form a word, Korean characters may be horizontally aligned or vertically aligned with other characters in forming a word. Further, because placement of certain alphabet characters may be based on sequence of input of respective alphabet characters in relation with inputted characters, the alphabet characters and their respective boundaries may be shifted such that spacing between the inputted characters may be closer together.

More specifically, as illustrated in FIG. 3C, when a Korean alphabet character " ㅉ " included in a boundary 306 is inputted, and a Korean alphabet character " ㅏ " included in a boundary 307 is inputted within a predetermined period of time from the inputting of the Korean alphabet character " ㅉ ", at least one of the boundaries 306 and 307 is horizontally shifted towards each other such that portions of the boundaries 306 and 307 overlap without respective Korean alphabet characters overlapping with one another. Further, if a Korean alphabet character " ㅇ " included in a boundary 308 is entered within a predetermined period of time from a previous input of a Korean alphabet character, then the boundary 308 may be positioned such that the boundary 308 vertically overlaps with the boundaries 306 and 307 without the respective Korean alphabet characters overlapping without one another. However, such shifting of boundaries of alphabet characters does not occur for general keyboards when an English alphabet character is entered subsequent entry of the Korean alphabet character, even if the English alphabet character is inputted within the predetermined time from the inputting of the Korean alphabet character. Accordingly, when inputting alphabet characters of differing languages, a Korean alphabet character normally positioned to be lower with respect to other Korean alphabet characters cannot be displayed at its designated position. Instead, such alphabet character will be placed adjacent to a previously inputted alphabet character, rendering it more difficult to decipher words being displayed. FIG. 3D exemplary illustrates such operation.

FIG. 3D illustrates a situation when a Korean alphabet character " ㅉ " included in a boundary 309 is inputted, and an English alphabet character "A" included in a boundary 310 is inputted subsequent to the inputting of the Korean alphabet character " ㅉ ", the boundaries 309 and 310 are disposed adjacent to one another without overlap. More specifically, regardless of how quickly the English alphabet character "A" is inputted within inputting of the Korean alphabet character " ㅉ ", the boundaries 309 and 310 are placed adjacent to one another without overlap. Further, if a Korean alphabet character " ㅇ " included in a boundary 311 is entered within a predetermined period of time from a previous input of the English alphabet character included in the boundary 310, then the boundary 311 is placed adjacent to the boundary 310 without overlap. More specifically, when alphabet characters of different languages are entered, the entered alphabet characters of the different languages are not combined regardless of timing or sequence of entry.

Figure 4A:
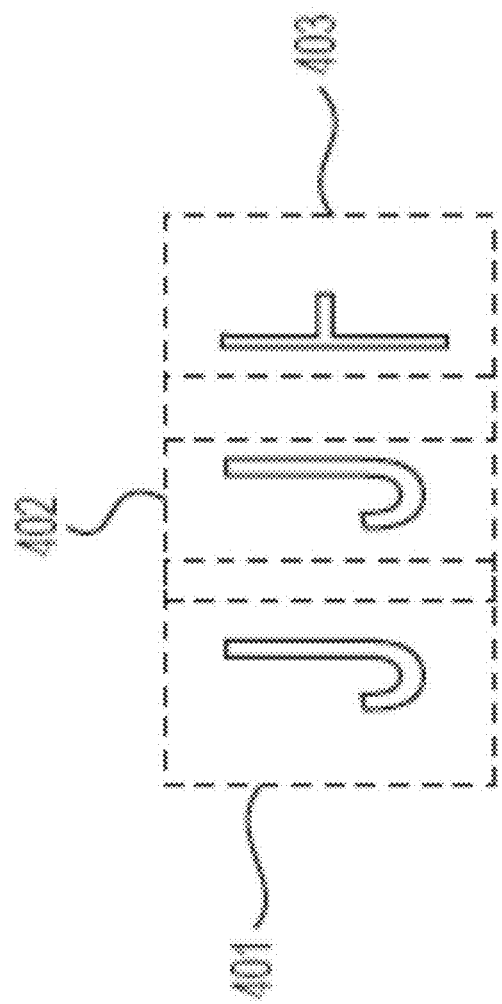
FIG. 4A shows an exemplary display of English alphabet characters combined with a Korean alphabet character, according to an aspect of the present disclosure.
Figure 4B:
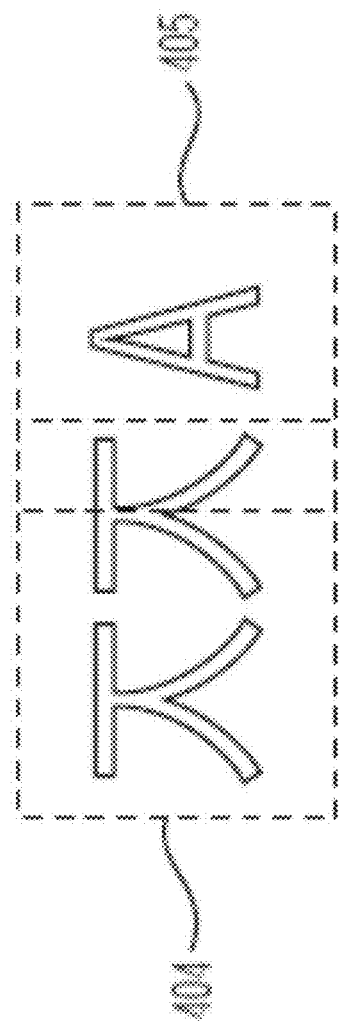
FIG. 4B shows an exemplary display of Korean alphabet character combined with an English alphabet character, according to an aspect of the present disclosure.
Figure 4C:
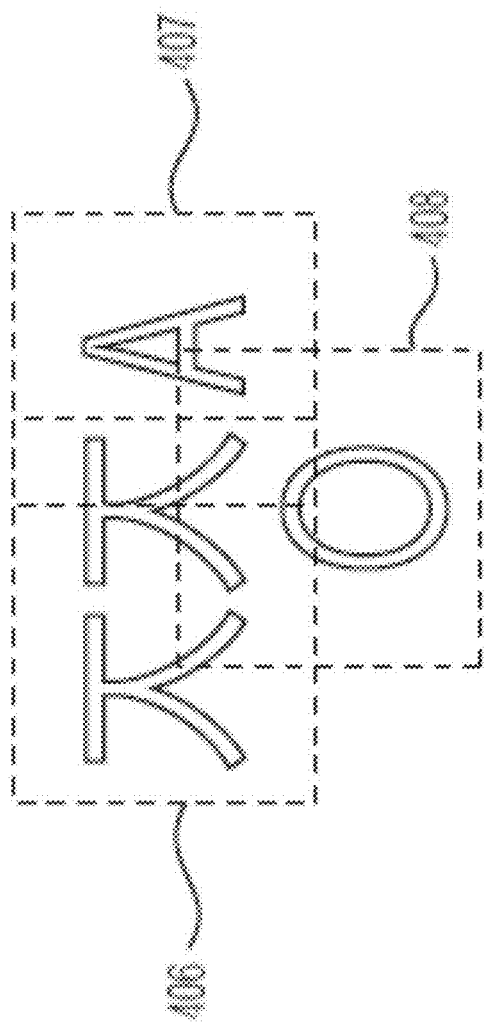
FIG. 4C shows an exemplary display of Korean alphabet characters combined with an English alphabet character, according to an aspect of the present disclosure.

FIG. 4A shows an exemplary display of English alphabet characters combined with a Korean alphabet character, according to an aspect of the present disclosure. FIG. 4B shows an exemplary display of Korean alphabet character combined with an English alphabet character, according to an aspect of the present disclosure. FIG. 4C shows an exemplary display of Korean alphabet characters combined with an English alphabet character, according to an aspect of the present disclosure. FIG. 4D shows an exemplary display of a sub-combination of alphabet characters, according to an aspect of the present disclosure.

As illustrated in FIG. 4A, a first letter "J" and a second letter "J" are adjacently aligned by aligning a right edge of a boundary 401 of the first letter "J" and a left edge of a boundary 402 of the second letter "J". When a Korean alphabet character " ㅏ " is inputted after the second letter "J", however, a left edge of a boundary 403 of the Korean alphabet character " ㅏ " is horizontally shifted towards the boundary 402 to overlap a portion of the boundary 402 with a portion of the boundary 403 without overlapping alphabet characters included therein. Further, the boundary of the Korean alphabet characters or the English alphabet characters may be modified to be uniform in size for more uniform shifting of the boundaries.

As illustrated in FIG. 4B, a Korean alphabet character "ㅉ" included in a boundary 404 is inputted, and subsequently, an English alphabet character "A" included in a boundary 405 is inputted. When a computing device determines that the Korean alphabet character "ㅉ" and the English alphabet character "A" are intended to be displayed as a combination, the boundary 404 may be shifted towards the boundary 405 to overlap a portion of the boundary 405 without having the alphabet characters included therein to overlap.

Further, FIG. 4C illustrates a combination of a Korean alphabet character "ㅉ" included in a boundary 406 is inputted and an English alphabet character "A" included in a boundary 407. The combination includes an overlapping portion of the boundaries 406 and 407. Further, FIG. 4C also illustrates Korean alphabet character "ㅇ" included in a boundary 408 being vertically aligned or arranged with respect to the combined boundaries 406 and 407. Although vertically aligned Korean alphabet characters are generally aligned with respect to only Korean alphabet characters, aspects of the present disclosure allows for combining of the vertically aligned Korean alphabet characters with respect to an English alphabet character.

For example, if the combined keyboard is set to recognize a combined word based on timing intervals or a time mode, received alphabet characters may be set to be combined if an input is received within a predetermined interval from a previous input of an alphabet character. Under this keyboard setting, the combined keyboard will receive a Korean alphabet character to be vertically aligned, if a horizontal combination of characters is already performed, and the Korean alphabet character is received within a predetermined time interval from a previous input of an alphabet character.

In another example, if the combined keyboard is set to recognize a combined word based on receipt of a designated key (e.g., space bar) or a key mode, received alphabet characters may be set to be combined until the designated key is receive to indicate to terminate current combination of alphabet characters to form a word, and move to a next set of alphabet characters to combine. Under this keyboard setting, the combined keyboard will receive a Korean alphabet character to be vertically aligned, if a horizontal combination of characters is already performed, and the Korean alphabet character is received before receiving of the designated key.

In an example, the combined keyboard may be set to operate in either a time mode or a key mode. Each of the modes may be turned on or off. Further, in certain instances, the combined keyboard may be set to operate in a combination of modes. For example, a sub-combination of limited characters may be performed based on time, while an overall combination of entered characters may be performed based on a key operation, or vice-versa.

Although the boundary of the Korean alphabet character is described as being shifted above, aspects of the present disclosure are not limited thereto, such that boundaries of the English alphabet characters may be shifted instead or conjunctively with the boundary of the Korean alphabet character.

As illustrated in FIG. 4D, when multiple alphabet characters of the same language are received within a predetermined interval, the received alphabet characters may be sub-combined as a double character. More specifically, when an English alphabet character "w" is entered and another English alphabet character "h" is entered within a predetermined interval (e.g., within 1 second) from the entry of "w", the English alphabet character "w" and the English alphabet character "h" is combined as a sub-combination or a single double character "wh". Alternatively, if the entry of "w" and "h" are entered in conjunction with actuation of a designated key (e.g., holding down a shift key, a space bar key, or other designated key), the English alphabet character "w" and the English alphabet character "h" is combined as a sub-combination or a single double character "wh". However, aspects of the present disclosures are not limited thereto, such that double characters may be formed by other operations.

Further, original boundary 409 surrounding "w" and original boundary 410 surrounding "h" may be combined to form a new boundary 411 surrounding the sub-combined double character "wh". In an example, the new boundary 411 may be the same size as the original boundary 409 or 410, or may be of a different size. Further, size of alphabet characters may retain their original size after the sub-combination or may be of a different size.

The double character "wh" may operate as a single character for combination purposes, such that when a Korean alphabet character "ㅗ" and another Korean alphabet character "ㅏ" are subsequently received in sequence for combination, a boundary 412 surrounding "ㅗ" and a boundary 413 surrounding "ㅏ" are combined with the new boundary 411.

Although sub-combination of English alphabet characters were disclosed in FIG. 4D, aspects of the present disclosure are not limited thereto, such that sub-combination of Korean alphabet characters or sub-combination of alphabet characters of different languages may be possible.

FIG. 5 shows an exemplary combined language keyboard layout, according to an aspect of the present disclosure.

As illustrated in FIG. 5, an exemplary combined language keyboard displays alphabet characters of a first language, such as English alphabet characters, at a lower region of key buttons. Further, alphabet characters of a second language, such as Korean alphabet characters, are displayed at an upper region of respective key buttons. In an example, the alphabet characters of the first language may be displayed to be larger than the alphabet characters of the second language. However, aspects of the present disclosure are not limited thereto, such that alphabet characters of two languages may appear to be similar in size. Further, the alphabet characters of the two languages may be displayed to be different sizes during entry according to a language being inputted. For example, if a shift key is pressed down to allow entry of an alphabet character of the second language, the alphabet characters of the second language may be displayed to be larger than the alphabet characters of the first language to visually indicate which language is in effect.

The combined language keyboard may operate in multiple modes in accordance with actuation of a mode key 501. More specifically, actuation of the mode key 501 will allow the combined language keyboard to operate either in a first mode or a second mode. The first mode may be a default mode in which it operates to allow entry of alphabet characters of the first language, but not the second language. The second mode may be a combined language mode, which may allow access to alphabet characters of two different languages without switching between keyboards.

In the first mode, pressing of a shift key 502 in conjunction with pressing of an alphabet key may allow entry of a capitalized alphabet character for the English language.

In the second mode, pressing of the shift key 502 in conjunction with pressing of an alphabet key may allow entry of a corresponding alphabet character of the Korean language to be entered. In this regard, the alphabet characters of the first language may operate in either all capital letters or all lower case letters, since capitalization of the English alphabet characters would not be as relevant when inputting a combination of alphabet characters of the two languages. Further, it is also noted that a shift key only effects entry of five characters in the Korean language.

In particular, the shift key is typically used to enter double consonants "ㅃ", "ㅉ", "ㄸ", "ㄲ", and "ㅆ", which correspond to singular consonants of "ㅂ", "ㅈ", "ㄷ", "ㄱ", and "ㅅ", respectively. Further, the shift key may be used to enter an entry of compound vowels "ㅒ" and "ㅖ", which correspond to singular vowels "ㅐ" and "ㅔ". In this regard, since the double consonants are double entries of the singular consonants, entry of the double consonants may be performed by double entries of corresponding singular consonants within a predetermined period of time. Similar operation may be performed for the above noted compound vowels. Further, in this regard, double consonants may be produced for the English alphabet characters. For example, double entry of "s" may trigger the combination keyboard to format the double entry of "s" to be smaller and closer together to provide a similar display as the double consonants of the Korean language.

Accordingly, a user may utilize the combined keyboard layout to quickly input alphabet characters of two different languages without having to switch between two different keyboards, leading to a more efficient usage of memory and a more efficient operation.

FIG. 6A shows another exemplary combined language keyboard layout with a consonant grouping, according to an aspect of the present disclosure. FIG. 6B shows another exemplary combined language keyboard layout with a vowel grouping, according to an aspect of the present disclosure.

As illustrated in FIG. 6A, a combined keyboard may group consonants together in an area 601 for easier identification of alphabet characters. As illustrated in FIG. 6B, a combined keyboard may group vowels together in an area 602 for easier identification of alphabet characters. In an example, the area 601 and area 602 may be displayed on separate screens, which may be toggled back and forth via a swiping operation or by pressing of a button.

Further, one or more keys included in the area 601 may display both an English alphabet character and a corresponding Korean alphabet character as separate keys. However, aspects of the present application are not limited thereto, such that alphabet characters in both languages may be displayed on a single key.

Similarly, one or more keys included in the area 602 may display both an English alphabet character and a corresponding Korean alphabet character as separate keys. However, aspects of the present application are not limited thereto, such that alphabet characters in both languages may be displayed on a single key.

Figure 7:
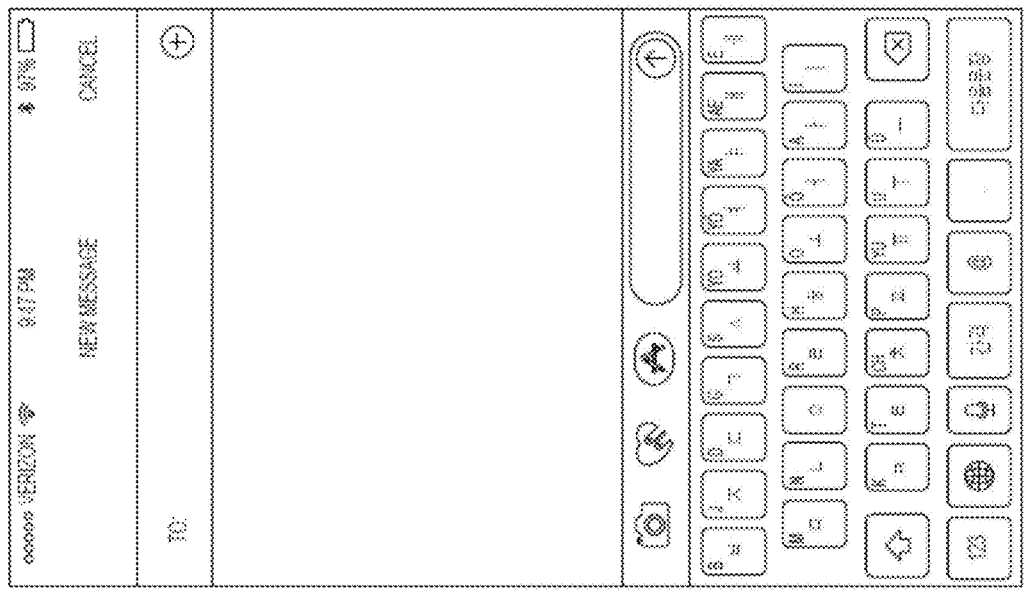
FIG. 7 shows another exemplary combined language keyboard layout, according to an aspect of the present disclosure.

FIG. 7 shows another exemplary combined language keyboard layout, according to an aspect of the present disclosure.

As illustrated in FIG. 7, a combined keyboard may display a layout of keys displaying English alphabet characters and corresponding Korean alphabet character based on their phonetic relationship. For example, a key of the combined keyboard may display "S" as a primary key and "ㅅ" as a secondary key, which may have a similar sound as "S". Based on such a layout, a user may be able to quickly identify alphabet characters of both languages according to phonics. Although the English alphabet character is described as a primary key, aspects of the present disclosure are not limited. For example, keys of the combined keyboard may display Korean alphabet characters as primary keys and the English alphabet characters as secondary keys.

Figure 8:
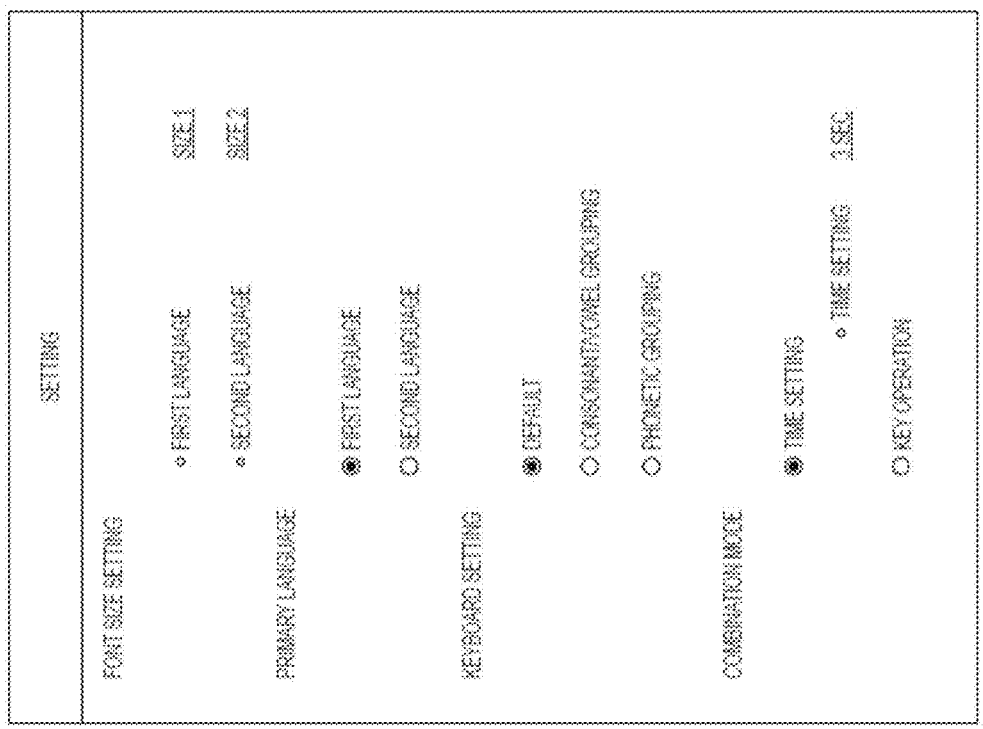
FIG. 8 shows an exemplary combined language keyboard layout configuration menu, according to an aspect of the present disclosure.

FIG. 8 shows an exemplary combined language keyboard layout configuration menu, according to an aspect of the present disclosure.

As illustrated in FIG. 8, the combined keyboard may be configured in various ways. For example, font size may be set in various sizes according to user preferences, a primary language may be selected, a keyboard layout setting may be selected, and a method for combining of alphabet characters may be selected.

More specifically, alphabet characters displayed on individual keys may be configured to be displayed at a certain size for each of the languages. Alphabet characters of the first language may be set to be displayed larger than, same as, or smaller than alphabet characters of the second language. Further, primary language may be selected. The selection of the primary language may dictate a default operation when the keyboard is not operating in a combination mode. Further, the selection of the primary language may provide a particular placement of the alphabet characters (e.g., central or lower than an alphabet character of a secondary language) to be displayed on each of the keys of the combined keyboard. The keyboard setting may be set according to a preferred configuration. For example, the keyboard may bet set to a default configuration (e.g., FIG. 5), according to a consonant/vowel grouping (e.g., FIG. 6), or according to a phonetic grouping (e.g., FIG. 7). However, aspects of the present disclosure are not limited thereto, such that other configurations may be possible according to other groupings.

Further, alphabet character combination method may be selected. More specifically, the alphabet character combination may be set to be combined according to a time setting or based on a particular key operation. In the time setting, a received alphabet characters may be set to be combined with a previously inputted alphabet character, regardless of language, if an input is received within a predetermined interval from a previous input of an alphabet character. The predetermined interval may be set according to a user preference (e.g., 3 seconds).

In the particular key operation setting, if the combined keyboard is set to recognize a combined word based on receipt of a designated key (e.g., space bar), received alphabet characters may be set to be combined until the designated key is receive to indicate to terminate current combination of alphabet characters to form a word, and move to a next set of alphabet characters to combine. However, aspects of the present disclosure are not limited thereto, such that a combination of next set of alphabet characters may be performed if the previous combination includes entries of more alphabet characters than it can combine.

Figure 9:
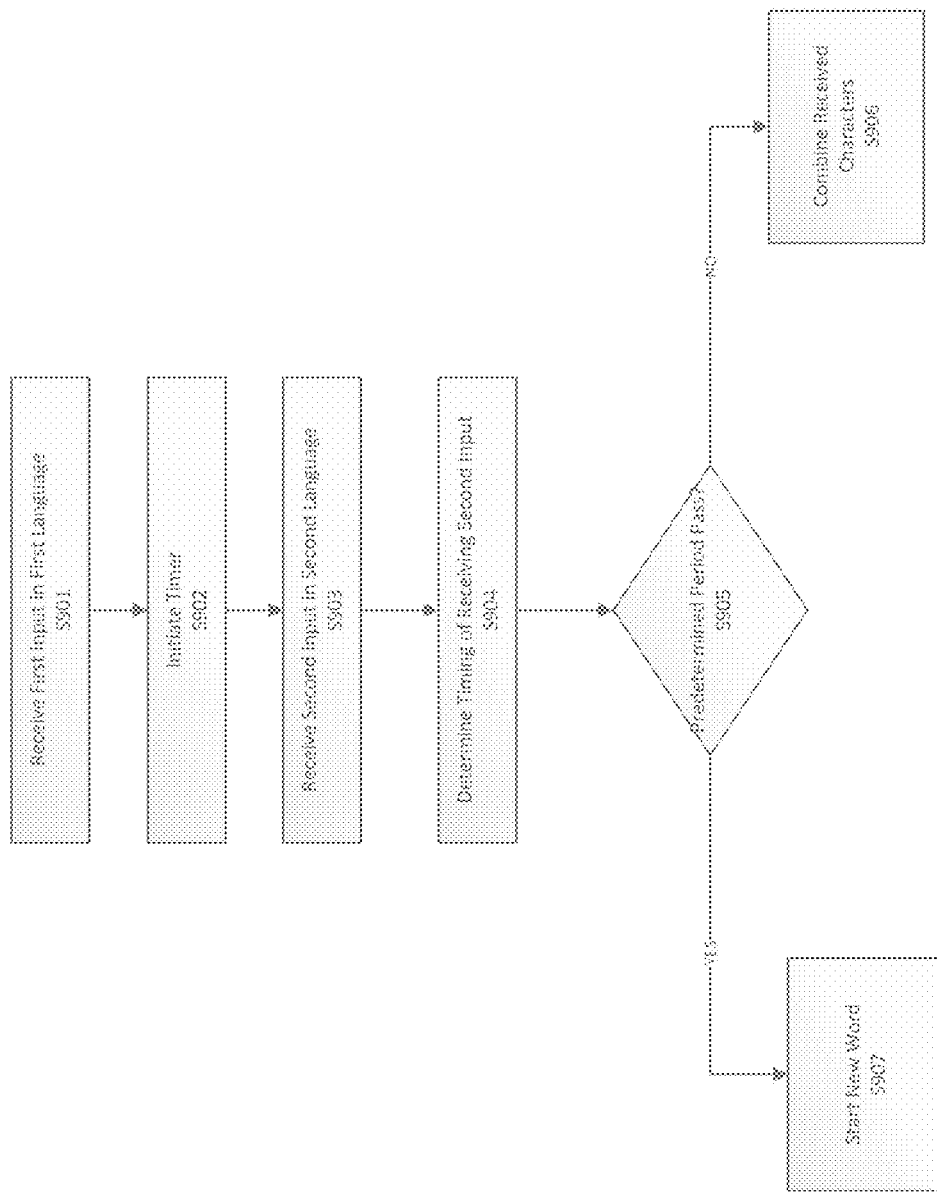
FIG. 9 shows an exemplary process flow for combining alphabet characters of different languages, according to an aspect of the present disclosure.

FIG. 9 shows an exemplary process flow for combining alphabet characters of different languages, according to an aspect of the present disclosure.

In step 901, an alphabet character of a first language is received on a combined keyboard. The first language may be a default or dominant language of the user. For example, the first language may be English.

In step 902, upon receipt of the input of the alphabet character of the first language, a timer may be initiated. More specifically, a timing at which the alphabet character of the first language is received is determined. For example, the timer may be initiated when the combined keyboard is operating in a multi-language mode or when the combined keyboard is operating in a mode where alphabet characters are combined to form a singular word or pseudo word.

In step 903, an alphabet character of a second language is received on the combined keyboard. The second language may be a secondary language of the user. For example, the second language may be Korean. However, aspects of the present disclosure are not limited thereto, such that the secondary language may be any language having an alphabet system comprised of consonants and vowels.

In an example, an alphabet character of the second language may be inputted by operating a shift key or any other designated key that may be deemed suitable.

In step 904, a timing at which the alphabet character of the second language is received is determined.

In step 905, a time difference between receiving of the alphabet character of the first language and the alphabet character of the second language is determined.

If the time difference is determined to be less than a predetermined duration, the alphabet character of the first language and the alphabet character of the second language may be combined according to an input sequence in step 906.

If the time difference is determined to be greater than a predetermined duration, the alphabet character of the first language and the alphabet character of the second language may not be combined in step 907. Rather, the alphabet character of the second language may be started as a new word or pseudo word.

Figure 10:
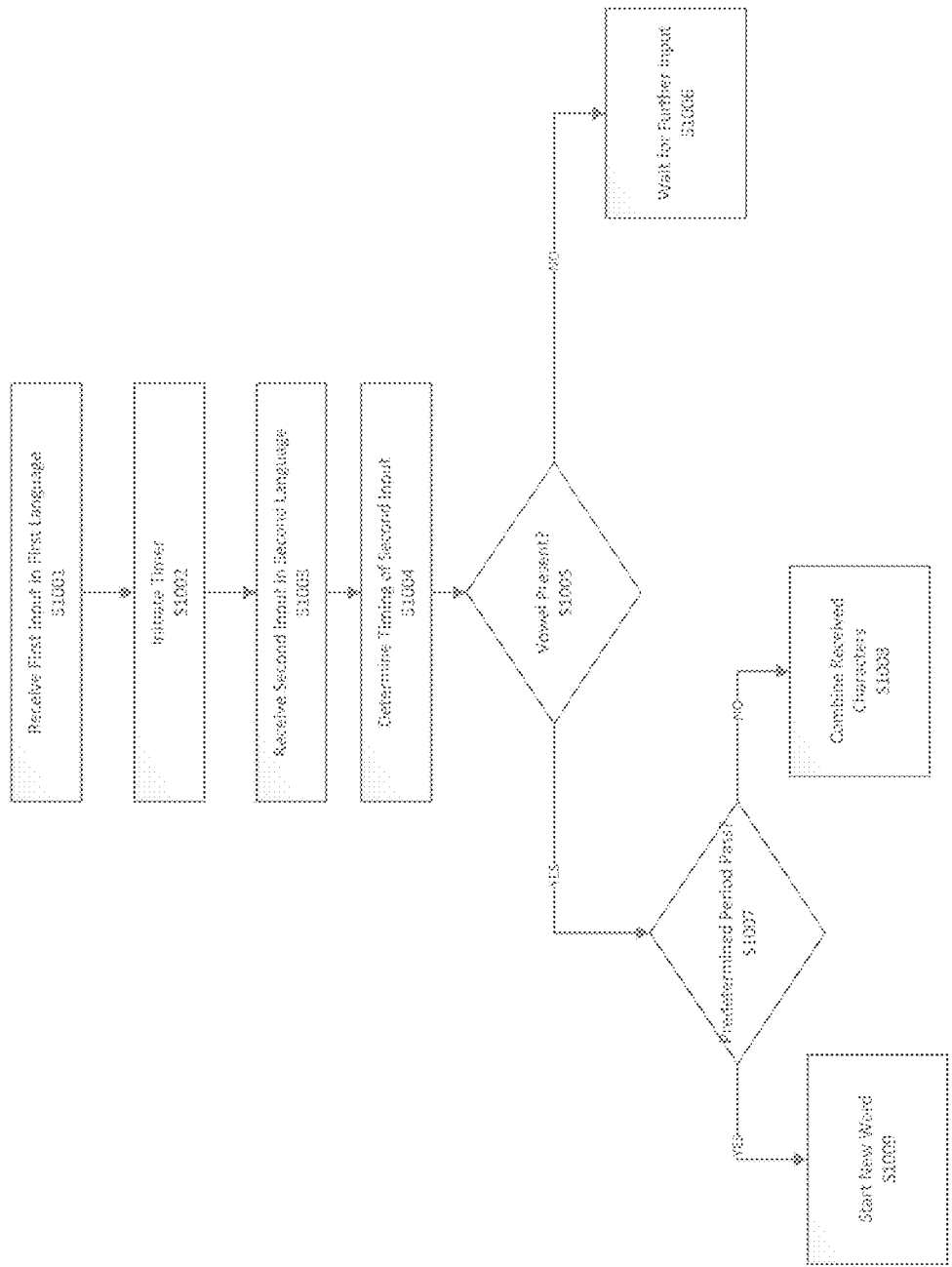
FIG. 10 shows an exemplary process flow for combining alphabet characters of different languages, according to an aspect of the present disclosure.

FIG. 10 shows an exemplary process flow for combining alphabet characters of different languages, according to an aspect of the present disclosure.

In step 1001, an alphabet character of a first language is received on a combined keyboard. The first language may be a default or dominant language of the user. For example, the first language may be English.

In step 1002, upon receipt of the input of the alphabet character of the first language, a timer may be initiated. More specifically, a timing at which the alphabet character of the first language is received is determined. For example, the timer may be initiated when the combined keyboard is operating in a multi-language mode or when the combined keyboard is operating in a mode where alphabet characters are combined to form a singular word or pseudo word.

In step 1003, an alphabet character of a second language is received on the combined keyboard. The second language may be a secondary language of the user. For example, the second language may be Korean. However, aspects of the present disclosure are not limited thereto, such that the secondary language may be any language having an alphabet system comprised of consonants and vowels.

In an example, an alphabet character of the second language may be inputted by operating a shift key or any other designated key that may be deemed suitable.

In step 1004, a timing at which the alphabet character of the second language is received is determined.

In step 1005, a determination is made whether a vowel is present among the alphabet characters of the first language and the second language.

If it is determined that a vowel is not present among the alphabet characters of the first language and the second language, the combined keyboard further waits to receive a vowel input before starting a new word or pseudo word in step 1006.

If it is determined that a vowel is present among the alphabet characters received by the combined keyboard, a time difference between receiving of the alphabet character of the first language and the alphabet character of the second language is determined in step 1007.

If the time difference is determined to be less than a predetermined duration, the alphabet character of the first language and the alphabet character of the second language may be combined according to an input sequence in step 1008.

If the time difference is determined to be greater than a predetermined duration, the alphabet character of the first language and the alphabet character of the second language may not be combined in step 1009. Rather, the alphabet character of the second language may be started as a new word or pseudo word.

FIG. 11 shows an exemplary process flow for combining alphabet characters of different languages, according to an aspect of the present disclosure.

In step 1101, a key based language combination mode is entered. For example, the key based language combination mode may be entered by actuating a mode button on a combined keyboard or by selecting the respective mode on a configuration screen. The key based language combination mode may allow alphabet characters to be continually combined until a designated key is selected to indicate completion of a word or pseudo word. However, aspects of the present disclosure are not limited thereto, such that a new word or pseudo word may begin under certain conditions. For example, if the number of characters exceeds a predetermined number of combinable characters (e.g., 4 or 5 alphabet characters), a new word or pseudo word may begin. In another example, a new word or pseudo word may begin according to a sequence of key entry. Further, if a Korean alphabet character designated for placement at a lower part of a word or pseudo word, the combined keyboard may input a subsequent entry of a consonant as beginning of a new word or pseudo word.

In step 1102, an alphabet character of a first language is received on a combined keyboard. The first language may be a default or dominant language of the user. For example, the first language may be English.

In step 1103, an alphabet character of a second language is received on the combined keyboard. The second language may be a secondary language of the user. For example, the second language may be Korean. However, aspects of the present disclosure are not limited thereto, such that the secondary language may be any language having an alphabet system comprised of consonants and vowels.

In step 1104, a determination of whether a designated key is pressed is made. For example, the designated key may be a space bar or another key.

If the designated key is determined not to have been pressed in step 1104, whether the received number of alphabet characters exceeds a predetermined number is determined in step 1105.

If the received number of alphabet characters does not exceed the predetermined number, then the combined keyboard waits to receive further input for combination in step S1106. If the received number of alphabet characters exceeds the predetermined number, then the received alphabet character is entered as part of a new word or pseudo word in S1107.

If the designated key is determined to have been pressed in step 1104, the entered alphabet characters are combined according to a received sequence in step 1105.

Although aspects of the present disclosure were described with respect to a virtual keyboard, the present disclosure is not limited thereto. Certain aspects or improvements may be also implemented on a physical keyboard connected to a computing device or an on-board keyboard system.

Further, although combination of alphabet characters of Korean and English are mainly described in the present application, aspects of the present disclosure are not limited thereto, such that aspects of the present disclosure may be applicable to other languages using an alphabet system including consonants and vowels.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a method is provided for combining of alphabet characters of different languages. The method includes loading, from a memory, a combined virtual keyboard providing simultaneous access to both an alphabet character of a first language and an alphabet character of a second language; receiving, on the combined keyboard, an input of the alphabet character of the first language; receiving, on the combined keyboard, an input of the alphabet character of the second language; displaying, on a display, the inputted alphabet character of the first language and the alphabet character of the second language, wherein each of the inputted alphabet characters of the first language and the second language has an image of respective alphabet character surrounded by a quadrilateral boundary of a predetermined size; and shifting at least one of the alphabet character of the first language and the alphabet character of the second language towards each other, such that boundaries surrounding the alphabet characters are partially overlapped.

According to another aspect of the present disclosure, one of the first and second languages is Korean, and other of the first and second languages is English.

According to yet another aspect of the present disclosure, the boundaries surrounding the alphabet characters are of a same size or different sizes.

According to still another aspect of the present disclosure, the shifting is performed either in a horizontal direction or a vertical direction.

According to another aspect of the present disclosure, the method further includes starting a timer when the input of the alphabet character of the first language is received; determining a time at which the input of the alphabet character of the second language is received; determining whether duration of time between starting of the timer and receiving of the input of the alphabet character of the second language is less than a predetermined period of time; when the duration is determined to be less than the predetermined period of time, combining the inputted alphabet characters of the first language and the second language; and when the duration is determined to be greater than or equal to the predetermined period of time, entering the alphabet character of the second language as a new word.

According to yet another aspect of the present disclosure, the method further includes determining whether one of the alphabet characters of the first and second language is a vowel. The timer being started when one of the alphabet characters of the first and second language is a vowel.

According to still another aspect of the present disclosure, the method further includes determining a mode of combination set for the combination keyboard. The mode being either a time mode or a key based mode.

According to another aspect of the present disclosure, when the mode of combination is the time mode, the shifting is performed based on duration of time between a time of input of the alphabet character of the first language and a time of input of the alphabet character of the second language.

According to yet another aspect of the present disclosure, when the mode of combination is the key based mode, the shifting is performed when a designated key is actuated.

According to still another aspect of the present disclosure, the method includes determining a number of alphabet characters that have been inputted for a first word. When the number of alphabet characters inputted for the first word is equal to or below a predetermined value, performing the shifting. Also, when the number of alphabet characters inputted for the first word is greater than the predetermined value, registering last received alphabet character as part of a second word.

According to another aspect of the present disclosure, the method includes displaying, on keys of the combined keyboard, both an alphabet character of the first language and an alphabet character of the second language.

According to yet another aspect of the present disclosure, the method includes displaying, on the combined keyboard, a mode key for setting a mode of combination.

According to still another aspect of the present disclosure, the method includes the alphabet character of the second language is a phonetic equivalent of the alphabet character of the first language.

According to another aspect of the present disclosure, the method includes displaying, on the combined keyboard, a grouping of consonant keys and a grouping of vowel keys.

According to yet another aspect of the present disclosure, the combined keyboard displays only a capital form of alphabet characters of one of the first language or the second language.

According to still another aspect of the present disclosure, double consonant alphabet character of one of the first language or the second language is entered by actuating a corresponding key multiple times within a predetermined time.

According to an aspect of the present disclosure, a non-transitory computer readable storage medium stores a computer program. The computer program, when executed by a processor, causes a computer apparatus to perform a process. The process includes loading, from a memory, a combined virtual keyboard providing simultaneous access to both an alphabet character of a first language and an alphabet character of a second language; receiving, on the combined keyboard, an input of the alphabet character of the first language; receiving, on the combined keyboard, an input of the alphabet character of the second language; displaying, on a display, the inputted alphabet character of the first language and the alphabet character of the second language, wherein each of the inputted alphabet characters of the first language and the second language has an image of respective alphabet character surrounded by a quadrilateral boundary of a predetermined size; and shifting at least one of the alphabet character of the first language and the alphabet character of the second language towards each other, such that boundaries surrounding the alphabet characters are partially overlapped.

According to an aspect of the present disclosure, a computer apparatus includes a memory that stores instructions, and a processor that executes the instructions. When executed by the processor, the instructions cause the processor to perform operations. The operations include loading a combined virtual keyboard providing simultaneous access to both an alphabet character of a first language and an alphabet character of a second language; receiving, on the combined keyboard, an input of the alphabet character of the first language; receiving, on the combined keyboard, an input of the alphabet character of the second language; displaying, on a display, the inputted alphabet character of the first language and the alphabet character of the second language, wherein each of the inputted alphabet characters of the first language and the second language has an image of respective alphabet character surrounded by a quadrilateral boundary of a predetermined size; and shifting at least one of the alphabet character of the first language and the alphabet character of the second language towards each other, such that boundaries surrounding the alphabet characters are partially overlapped.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for combining alphabet characters of different languages, the method comprising:
    loading, from a memory, a combined virtual keyboard providing simultaneous access to both an alphabet character of a first language and an alphabet character of a second language;
    receiving, on the combined keyboard, an input of the alphabet character of the first language;
    receiving, on the combined keyboard, an input of the alphabet character of the second language;
    displaying, on a display, the inputted alphabet character of the first language and the alphabet character of the second language, wherein each of the inputted alphabet characters of the first language and the second language has an image of respective alphabet character surrounded by a quadrilateral boundary of a predetermined size;
    shifting at least one of the alphabet character of the first language and the alphabet character of the second language towards each other, such that boundaries surrounding the alphabet characters are partially overlapped;
    starting a timer when the input of the alphabet character of the first language is received;
    determining a time at which the input of the alphabet character of the second language is received;
    determining whether duration of time between starting of the timer and receiving of the input of the alphabet character of the second language is less than a predetermined period of time;
    when the duration is determined to be less than the predetermined period of time, combining the inputted alphabet characters of the first language and the second language; and when the duration is determined to be greater than or equal to the predetermined period of time, entering the alphabet character of the second language as a new word.

2. The method of claim 1, wherein one of the first and second languages is Korean, and other of the first and second languages is English.

3. The method of claim 1, wherein the boundaries surrounding the alphabet characters are of a same size.

4. The method of claim 1, wherein the boundaries surrounding the alphabet characters are of different sizes.

5. The method of claim 1, wherein the shifting is performed in a horizontal direction.

6. The method of claim 1, wherein the shifting is performed in a vertical direction.

7. The method of claim 1, further comprising:
determining whether one of the alphabet characters of the first and second language is a vowel,
wherein the timer is started when one of the alphabet characters of the first and second language is a vowel.

8. The method of claim 1, further comprising:
determining a mode of combination set for the combination keyboard,
wherein the mode is either of a time mode or a key based mode.

9. The method of claim 8, wherein, when the mode of combination is the time mode, the shifting is performed based on a duration of time between a time of input of the alphabet character of the first language and a time of input of the alphabet character of the second language.

10. The method of claim 8, wherein, when the mode of combination is the key based mode, the shifting is performed when a designated key is actuated.

11. The method of claim 1, further comprising:
determining a number of alphabet characters that have been inputted for a first word,
wherein, when the number of alphabet characters inputted for the first word is equal to or below a predetermined value, performing the shifting, and
when the number of alphabet characters inputted for the first word is greater than the predetermined value, registering last received alphabet character as a part of a second word.

12. The method of claim 1, further comprising:
displaying, on keys of the combined keyboard, both an alphabet character of the first language and an alphabet character of the second language.

13. The method of claim 1, further comprising:
displaying, on the combined keyboard, a mode key for setting a mode of combination.

14. The method of claim 13, wherein the alphabet character of the second language is a phonetic equivalent of the alphabet character of the first language.

15. The method of claim 1, further comprising:
displaying, on the combined keyboard, a grouping of consonant keys and a grouping of vowel keys.

16. The method of claim 1, wherein the combined keyboard displays only a capital form of alphabet characters of one of the first language or the second language.

17. The method of claim 1, wherein a double alphabet character of one of the first language or the second language is entered by actuating a corresponding key multiple times within a predetermined time.

18. A non-transitory computer readable storage medium that stores a computer program, the computer program, when executed by a processor, causing a computer apparatus to perform a process comprising:
loading, from a memory, a combined virtual keyboard providing simultaneous access to both an alphabet character of a first language and an alphabet character of a second language;
receiving, on the combined keyboard, an input of the alphabet character of the first language;
receiving, on the combined keyboard, an input of the alphabet character of the second language;
displaying, on a display, the inputted alphabet character of the first language and the alphabet character of the second language, wherein each of the inputted alphabet characters of the first language and the second language has an image of respective alphabet character surrounded by a quadrilateral boundary of a predetermined size;
shifting at least one of the alphabet character of the first language and the alphabet character of the second language towards each other, such that boundaries surrounding the alphabet characters are partially overlapped;
starting a timer when the input of the alphabet character of the first language is received;
determining a time at which the input of the alphabet character of the second language is received;
determining whether duration of time between starting of the timer and receiving of the input of the alphabet character of the second language is less than a predetermined period of time;
when the duration is determined to be less than the predetermined period of time, combining the inputted alphabet characters of the first language and the second language; and
when the duration is determined to be greater than or equal to the predetermined period of time, entering the alphabet character of the second language as a new word.

19. A computer apparatus, comprising:
a memory that stores instructions, and
a processor that executes the instructions,
wherein, when executed by the processor, the instructions cause the processor to perform operations comprising:
loading a combined virtual keyboard providing simultaneous access to both an alphabet character of a first language and an alphabet character of a second language;
receiving, on the combined keyboard, an input of the alphabet character of the first language;
receiving, on the combined keyboard, an input of the alphabet character of the second language;
displaying, on a display, the inputted alphabet character of the first language and the alphabet character of the second language, wherein each of the inputted alphabet characters of the first language and the second language has an image of respective alphabet character surrounded by a quadrilateral boundary of a predetermined size;
shifting at least one of the alphabet character of the first language and the alphabet character of the second language towards each other, such that boundaries surrounding the alphabet characters are partially overlapped;
starting a timer when the input of the alphabet character of the first language is received;
determining a time at which the input of the alphabet character of the second language is received;

determining whether duration of time between starting of the timer and receiving of the input of the alphabet character of the second language is less than a predetermined period of time;

when the duration is determined to be less than the predetermined period of time, combining the inputted alphabet characters of the first language and the second language; and when the duration is determined to be greater than or equal to the predetermined period of time, entering the alphabet character of the second language as a new word.

20. A method for combining alphabet characters of different languages, the method comprising:

loading, from a memory, a combined virtual keyboard providing simultaneous access to both an alphabet character of a first language and an alphabet character of a second language;

receiving, on the combined keyboard, an input of the alphabet character of the first language;

receiving, on the combined keyboard, an input of the alphabet character of the second language;

displaying, on a display, the inputted alphabet character of the first language and the alphabet character of the second language, wherein each of the inputted alphabet characters of the first language and the second language has an image of respective alphabet character surrounded by a quadrilateral boundary of a predetermined size;

shifting at least one of the alphabet character of the first language and the alphabet character of the second language towards each other, such that boundaries surrounding the alphabet characters are partially overlapped;

determining a number of alphabet characters that have been inputted for a first word, wherein, when the number of alphabet characters inputted for the first word is equal to or below a predetermined value, performing the shifting, and when the number of alphabet characters inputted for the first word is greater than the predetermined value, registering last received alphabet character as a part of a second word.

21. A non-transitory computer readable storage medium that stores a computer program, the computer program, when executed by a processor, causing a computer apparatus to perform a process comprising:

loading, from a memory, a combined virtual keyboard providing simultaneous access to both an alphabet character of a first language and an alphabet character of a second language;

receiving, on the combined keyboard, an input of the alphabet character of the first language;

receiving, on the combined keyboard, an input of the alphabet character of the second language;

displaying, on a display, the inputted alphabet character of the first language and the alphabet character of the second language, wherein each of the inputted alphabet characters of the first language and the second language has an image of respective alphabet character surrounded by a quadrilateral boundary of a predetermined size;

shifting at least one of the alphabet character of the first language and the alphabet character of the second language towards each other, such that boundaries surrounding the alphabet characters are partially overlapped;

determining a number of alphabet characters that have been inputted for a first word, wherein, when the number of alphabet characters inputted for the first word is equal to or below a predetermined value, performing the shifting, and when the number of alphabet characters inputted for the first word is greater than the predetermined value, registering last received alphabet character as a part of a second word.

22. A computer apparatus, comprising:

a memory that stores instructions, and a processor that executes the instructions, wherein, when executed by the processor, the instructions cause the processor to perform operations comprising:

loading a combined virtual keyboard providing simultaneous access to both an alphabet character of a first language and an alphabet character of a second language;

receiving, on the combined keyboard, an input of the alphabet character of the first language;

receiving, on the combined keyboard, an input of the alphabet character of the second language;

displaying, on a display, the inputted alphabet character of the first language and the alphabet character of the second language, wherein each of the inputted alphabet characters of the first language and the second language has an image of respective alphabet character surrounded by a quadrilateral boundary of a predetermined size;

shifting at least one of the alphabet character of the first language and the alphabet character of the second language towards each other, such that boundaries surrounding the alphabet characters are partially overlapped;

determining a number of alphabet characters that have been inputted for a first word, wherein, when the number of alphabet characters inputted for the first word is equal to or below a predetermined value, performing the shifting, and when the number of alphabet characters inputted for the first word is greater than the predetermined value, registering last received alphabet character as a part of a second word.

* * * * *